United States Patent [19]

Courts

[11] Patent Number: 5,136,706
[45] Date of Patent: Aug. 4, 1992

[54] ADAPTIVE MEMORY MANAGEMENT SYSTEM FOR COLLECTION OF GARBAGE IN A DIGITAL COMPUTER

[75] Inventor: Howard R. Courts, Austin, Tex.

[73] Assignee: Texas Instruments Incorporated, Dallas, Tex.

[21] Appl. No.: 44,385

[22] Filed: Apr. 30, 1987

[51] Int. Cl.⁵ .............................................. G06F 12/12
[52] U.S. Cl. ................................ 395/600; 364/281.1; 364/280; 364/246; 364/246.11; 364/DIG. 1; 395/425

[58] Field of Search ... 364/200 MS File, 900 MS File; 395/600, 425

[56] References Cited

U.S. PATENT DOCUMENTS

| | | | |
|---|---|---|---|
| 4,121,286 | 10/1978 | Venton et al. | 364/200 |
| 4,189,773 | 2/1980 | O'Meara | 364/200 |
| 4,218,756 | 8/1980 | Fraser | 364/900 |
| 4,414,624 | 11/1983 | Summer, Jr. et al. | 364/200 |
| 4,446,516 | 5/1984 | Nishimura | 364/200 |
| 4,507,729 | 3/1985 | Takahashi | 364/200 |
| 4,577,274 | 3/1986 | Ho et al. | 364/200 |
| 4,642,790 | 2/1987 | Minshull et al. | 364/900 |
| 4,660,130 | 4/1987 | Bartley et al. | 364/200 |
| 4,695,949 | 9/1987 | Thatte et al. | 364/200 |
| 4,754,394 | 6/1988 | Brantley | 364/200 |
| 4,775,932 | 10/1988 | Oxley et al. | 364/200 |
| 4,797,810 | 1/1989 | McEntee | 364/200 |
| 4,800,520 | 1/1989 | Iijima | 364/900 |
| 4,807,120 | 2/1989 | Courts | 364/200 |
| 4,811,216 | 3/1989 | Bishop | 364/200 |
| 4,853,842 | 8/1989 | Thatte | 364/200 |

FOREIGN PATENT DOCUMENTS 1329721 9/1973 United Kingdom ............ 364/200

OTHER PUBLICATIONS

*Generation Scavenging: A Non-Disruptive High Performance Storage Reclamation Algorithm*, by David Unger, ACM, 1984, pp. 157-167.

*Garbage Collection in a Large Lisp System*, by David A. Moon ACM, 1984, pp. 235-246.

Primary Examiner—Thomas C. Lee
Assistant Examiner—Eric Coleman
Attorney, Agent, or Firm—L. Joy Griebenow; William E. Hiller; Richard L. Donaldson

[57] ABSTRACT

A memory management system for a digital computer divides a virtual memory space into regions. Each region has attributes indicating generation, volatility, and activity. During garbage collection, memory objects referenced by normal program execution are copied to regions having an active attribute. Objects copied as a result of garbage collector scavenger action are moved to regions which are inactive. Increasing levels of inactivity are provided in different regions. Grouping of active objects into active regions causes a large proportion of main memory to contain only active objects, which minimizes paging and increases system performance.

12 Claims, 3 Drawing Sheets

ADAPTIVE MEMORY MANAGEMENT SYSTEM FOR COLLECTION OF GARBAGE IN A DIGITAL COMPUTER

BACKGROUND OF THE INVENTION

1. Field of the Invention

This invention relates generally to computer systems and more specifically to garbage collection memory management on a digital computer system.

2. Description of the Related Art

Garbage collection is the memory management technique of choice on symbolic computing systems. This is true on standard architecture machines running languages such as LISP as well as on dedicated LISP processors such as the Explorer from Texas Instruments. Garbage collection is oriented toward use with a dynamic memory containing a multitude of objects linked by pointers.

Garbage collection is the process of allocating new memory objects and returning to available memory those which can no longer be accessed. Computer systems which are not dedicated to running symbolic languages such as LISP generally utilize what is known as a stop and collect garbage collector. This operates by, when garbage collection becomes necessary, causing all normal operations to cease. The garbage collector then traces pointers from accessible objects to find all other accessible objects. Accessible objects are copied to a special location so they can be saved. The location for objects to be saved is called newspace, while the portion of virtual memory being collected is called oldspace. When all accessible objects have been copied, all of the memory in oldspace is freed for use by the system.

This type of memory management technique has a severe drawback in that the time required for the garbage collection process can be very long. Collection times of up to one hour are common in moderately large virtual memory spaces of several tens of megabytes. Garbage collection takes longer on larger virtual memories so that the delays necessary to collect the very large memories which are expected to exist on machines of the future will become interminable with the stop and collect process.

Systems which are dedicated to running LISP-like languages usually utilize a garbage collection technique known as incremental garbage collection. The general idea behind these techniques is to operate the garbage collector as a process concurrent with normal system activities. Garbage is reclaimed in small amounts over a period of time, ideally without unduly degrading the overall system performance.

Concurrent garbage collection techniques are more complex than the stop and copy technique, because care must be taken that the collector does not change pointers or move objects in such a way that the normal system functions are disrupted. Also, the normal system functions must not interfere with the operations of the collector. Concurrent systems have several rules regarding what can be done with various pointers stored in different logical spaces within the virtual address space, and these rules must be strictly observed at all times by the collector and normal system processes.

One result of these types of memory management techniques is that the virtual memory space tends to be filled with a very large number of very small objects. The average object size is typically about 25 bytes. This results in many small blocks being scattered around the very large virtual memory space. Since the amount of main memory in most systems is generally substantially smaller than virtual memory, it is necessary to swap memory pages between the main memory and the backing store, usually a hard disk, at a high rate. This paging upon a virtual memory fault is extremely time consuming.

The bandwidth of usable memory which can be paged to and from the disk is often the limiting factor in overall system performance. While the raw rate of information transfer to and from most disks is fairly high, the useful rate of transfer is often quite low. This can occur for several reasons. First, if the garbage collection process is not performed in a timely fashion, garbage objects tend to become intermixed with non-garbage objects. When this occurs it is not possible to transfer useful (non-garbage) objects to main memory without also transferring useless (garbage) objects. A procedure for timely collection of garbage is described in copending U.S. Pat. No. 4,807,120, titled TEMPORAL GARBAGE COLLECTOR WITH INDIRECTION CELLS, by Courts, assigned to the assignee of the present application, which application is hereby incorporated by reference in its entirety.

However, even when all true garbage is collected in a timely fashion, one can still have a very low rate of access to useful information if small objects of interest are located in the virtual address space intermixed with other objects which are not of interest at the same time. In large virtual address space systems it is quite common for the total size of all objects of interest over a period of time to be a small percentage of the total size of all objects which can be accessed. If this percentage is 10%, for example, and the objects of interest are uniformly intermixed with other objects not of interest, then the rate of useful information transfer from disk is only 10% of the raw transfer rate. Also, it takes 10 times as much main memory to hold a working set as would be required if it were possible to access only the useful information.

It is clearly desirable for a memory management system to arrange the placement of objects in the virtual address space such that it is very likely that if an object is needed then the other objects placed near it will also be needed at the same time. Such an object placement will increase the useful rate of information transfer from disk and also reduce the size of main memory required to hold a working set.

SUMMARY OF THE INVENTION

Therefore, according to the present invention, an adaptive memory manager is incorporated into a garbage collection system. Memory objects which are dynamically accessed by normal system functions are grouped together in active regions, while those which are not used during selected times are grouped together in inactive regions. This grouping takes place in a manner which causes the system to be dynamically optimized for a particular user or for the processes which it performs most often.

A virtual memory space is preferably divided into several generations, with the younger generations being collected the most often. Objects which survive the collection process of a particular generation are promoted to the next older generation. When the collection process begins, a scavenger process is held non-operational for a period of time. Objects which are accessed by normal system functions are copied to active regions. After the scavenger begins operation, objects which are copied as a result of the scavenger action are marked as inactive. Thus objects are classified as active or inactive based on current usage patterns on the system.

The novel features which characterize the present invention are defined by the claims. The foregoing and other objects and advantages of the present invention will hereinafter appear, and for purposes of illustration, but not of limitation, a preferred embodiment is described and shown in the drawings.

DESCRIPTION OF THE PREFERRED EMBODIMENT

The following description describes a symbolic processing environment such as will be found on a typical dedicated LISP machine, such as those available from Symbolics, Inc. and Texas Instruments Incorporated. The described functions could actually be implemented on any system which can support the necessary data structures and processing tools.

Figure 1:
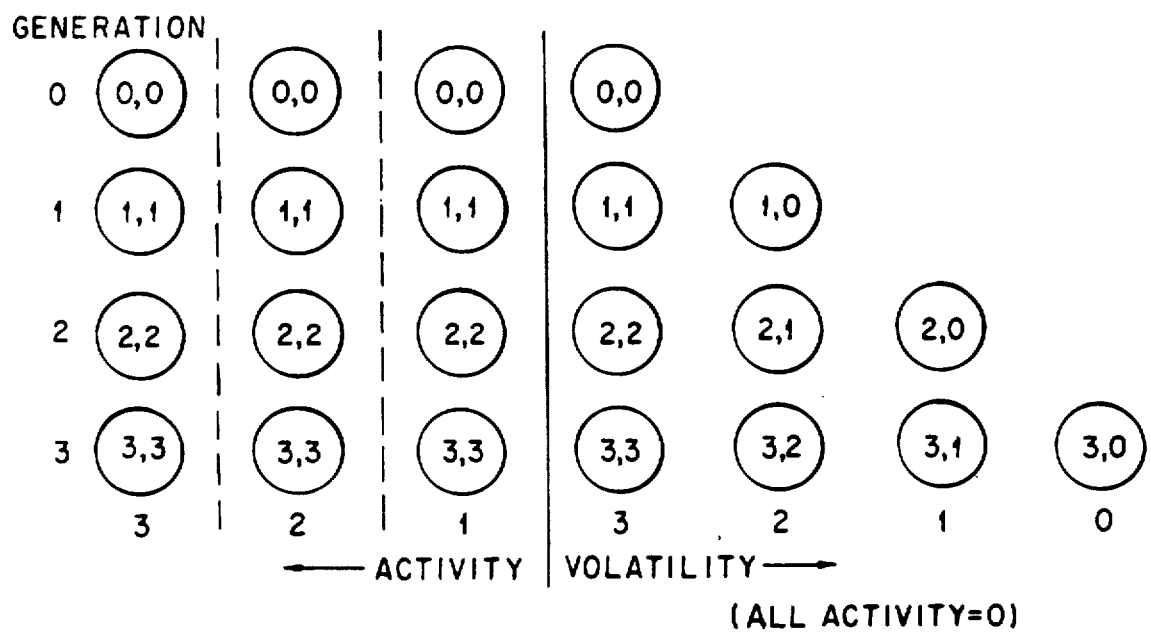
FIG. 1 is a diagram illustrating a division of a virtual memory space into regions.

In the preferred embodiment, objects are grouped by generation and volatility. This is illustrated in FIG. 1, which shows the virtual memory space divided in 22 conceptual "buckets". Each bucket has an associated generation, with generation 0 having the youngest objects and generation 3 having the oldest objects. Each bucket also has an associated volatility. The volatility indicates at which generations pointers in that bucket are allowed to point. Objects in a bucket are allowed to point to any generation having a number which is equal to or greater than the volatility of the bucket in which the pointer is located. This means that objects in younger generations can always point to older generations. Thus, objects in buckets (1,0), (2,0), and (3,0) are allowed to point to any other bucket. Objects in buckets (2,1) and (3,1) are allowed to point only to buckets of generation 1 or older. Objects in bucket (3,2) can only point to buckets of generation 2 and 3.

In addition to grouping by generation and volatility, the buckets which have generation equal to volatility are further divided by activity ranging from very active objects with activity 0 to very inactive objects with activity of 3.

Figure 2:
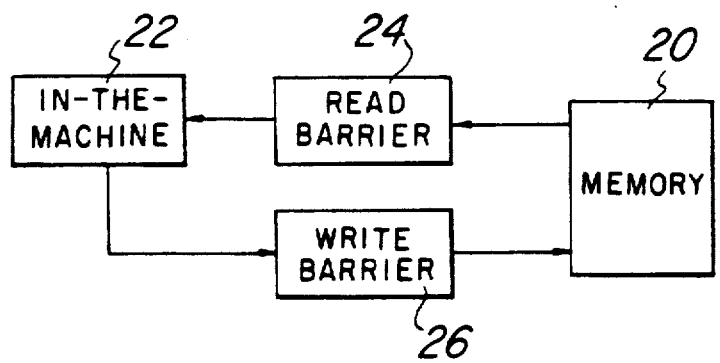
FIG. 2 is a high level block diagram of a computer system suitable for use with the present invention.

The collection of memory objects into buckets operates in conjunction with the conceptual system model shown in FIG. 2. In this model, memory 20 includes the entire virtual address space of the system. "In-the-machine" 22 is an abstraction, generally, of the system's general hardware registers. All values read from memory 20 into in-the-machine 22 must pass through a read barrier 24. All values written into memory 20 from in-the-machine 22 must pass through a write barrier 26. Additional details concerning the read and write barriers 24 and 26, and their preferred physical construction and operation, are found in copending U.S. application the above noted copending application, titled TEMPORAL GARBAGE COLLECTOR WITH INDIRECTION CELLS, by Courts.

The read and write barriers 24 and 26 enforce several rules which restrict what can be done by and with pointers. The following rules are applied: Any data item located in memory 20 must be moved to in-the-machine 22 before it can be used. Any write operation to memory 20 must store an item which is in-the-machine 22. This means that there is no direct memory to memory transfer. All data written to memory 20 must pass through the write barrier 26, which enforces the volatility restrictions described above. If an attempt is made to store a pointer to a generation which has a lower number than the volatility of the bucket into which the pointer is to be stored, a volatility violation is detected. The write barrier 26 causes the pointer to be stored into the appropriate bucket as a forwarding pointer, and the object in the original bucket is changed to point to the forwarding pointer.

The read barrier 24 prevents any pointer to oldspace (described below) from being placed in-the-machine 22. If an attempt is made to place a pointer to oldspace in-the-machine 22, a violation is detected. Also, in some cases as described below, the read barrier 24 also will not allow pointers to inactive buckets to be placed in-the-machine 22. If an attempt is made to move a pointer to an inactive bucket in-the-machine 22, the read barrier 24 invokes a process which copies the object pointed to by the violative pointer into an active bucket, and changes the pointer to point to the new location. Then the updated pointer is allowed in-the-machine 22, and normal processing resumes. An inactive bucket for these purposes is one which has an activity number greater than zero.

In operation, the garbage collector begins with an action called a flip. At the instant of the flip, the entire virtual memory space is divided into four spaces: newspace, oldspace, scavenge space, and train space. In the preferred embodiment this is done on a region by region basis, with each region being a contiguous block of virtual memory. This greatly simplifies bookkeeping during the collection process because it is not necessary to individually keep track of the space in which each word of memory is conceptually located; a single marker can be kept for the entire block. Also, each block is made up of a number of virtual pages, and all objects on each page should have the same generation and volatility. This is necessary for the scavenger to be able to simply move word by word through scavenge space, and is useful because all inactive objects will be located together on pages which remain, for the most part, on disk.

Thus, each region is made up of a number of virtual pages. Each region has an associated entry in a region attribute table, which is similar to a page table, and which indicates the generation, volatility and activity of the region, and whether it is oldspace, train space, newspace or scavenge space.

Figure 3:
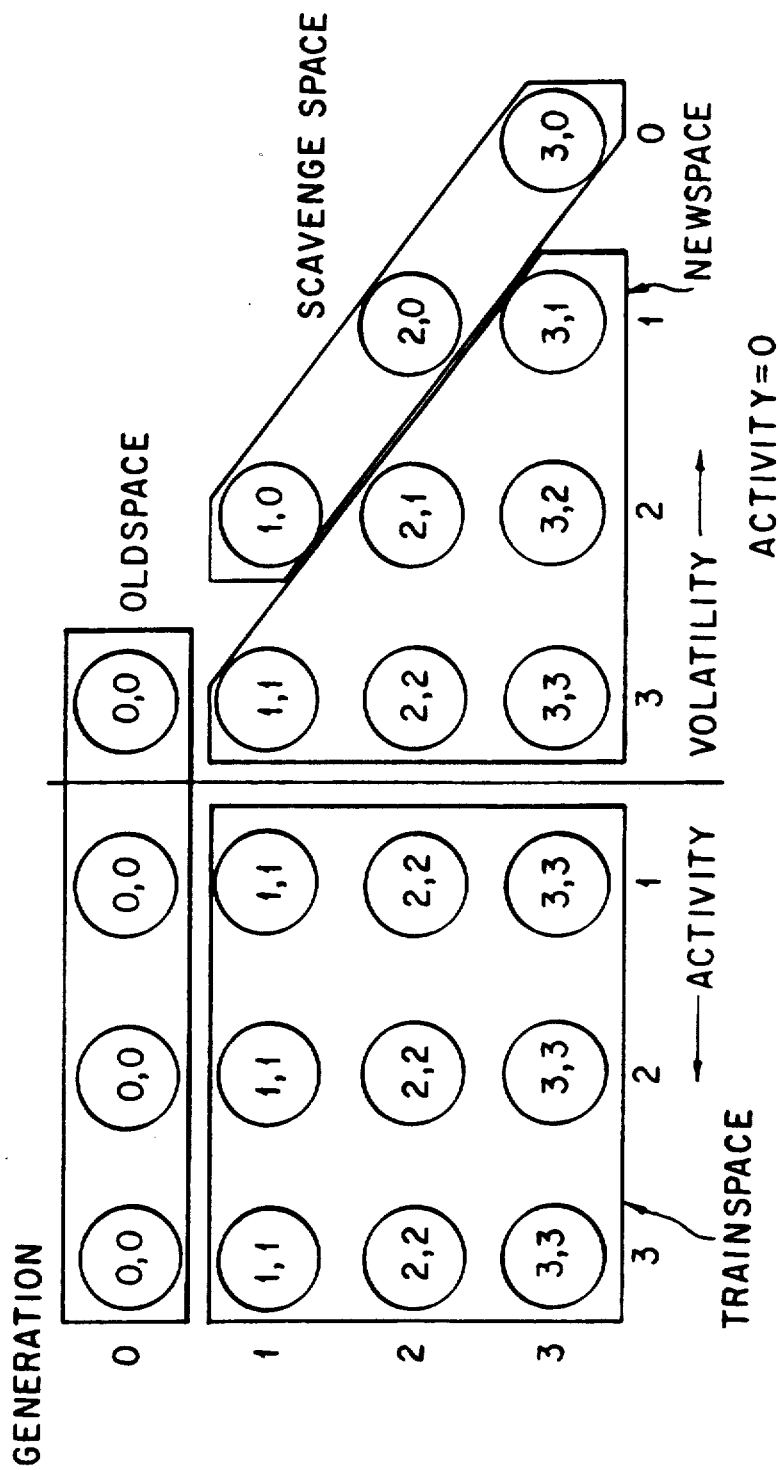
FIG. 3 is a diagram illustrating a grouping of regions into spaces during a garbage collection process.

FIG. 3 illustrates the state of the virtual memory space immediately after the flip for a generation 0 garbage collection. All buckets labelled (0,0) are in generation 0, and are marked as oldspace. All buckets which are capable of pointing into oldspace are marked as scavenge space. This includes only buckets (1,0), (2,0), and (3,0) for a generation 0 collection. The remaining buckets with activity 0 are newspace and those with activity other than 0 are marked as trainspace.

Figure 4:
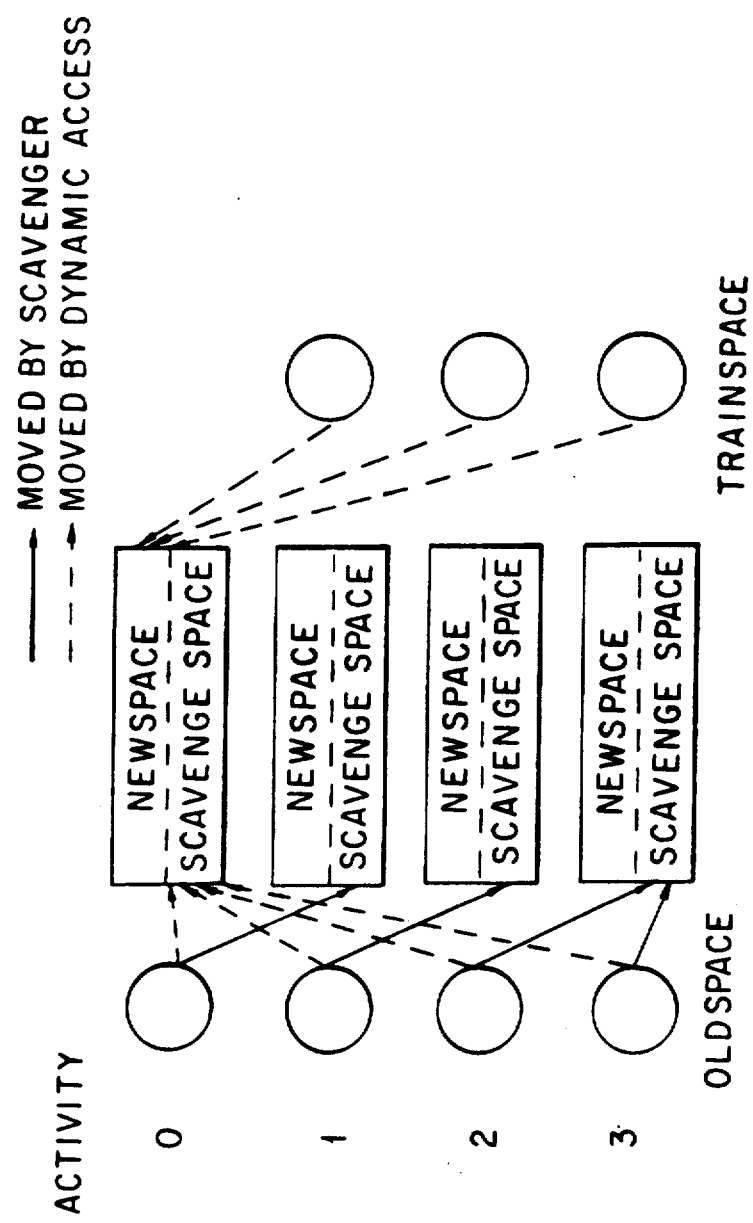
FIG. 4 is a diagram illustrating movement of memory objects between different regions of memory.

Immediately after the flip, the scavenger is inhibited for a period of time to provide normal systems activity the opportunity to cause truly active objects to be moved to a (1,1) bucket with activity 0. The time delay for holding the scavenger inhibited is controlled by allowing a threshold amount of memory allocation to occur after the flip before the scavenger is activated. The relationships between oldspace, trainspace, newspace and scavenge space during the collection process are shown in FIG. 4, which illustrates what movement of memory objects is allowed.

Movement of objects in memory is handled by a transport facility. When a read or write violation requires that a memory object be copied from one location to another, the transport facility is invoked to undertake that process. The transport facility can detect the difference between an object being moved because of scavenger action and an object being moved because of normal program execution and can take different action for the two driving functions. The rules which govern operation of the transport facility are as follows:

1. If normal program execution references an object in oldspace, that object will be copied from oldspace to scavenge space activity 0 since access by normal program execution is a direct certification that the object is active.

2. Only normal program execution can cause an object to be copied from trainspace, and if this occurs the object is copied to newspace activity 0, again since access by normal program execution is a direct certification that the object is active. The object can be copied directly to newspace since trainspace shares with newspace the property that all objects in trainspace are guaranteed not to contain pointers to oldspace.

3. When the scavenger causes an object to be copied from oldspace, the object is copied to scavenge space with an activity one greater than the activity of the oldspace bucket. Objects already having an activity of 3 remain in activity 3 space. This indicates that these objects are still accessible and thus are not garbage, but it is not expected that they will actually be used. Through the normal course of events, virtual memory pages containing inactive objects will be paged to disk where they will remain most of the time. During the next generation 0 flip, these inactive buckets will become trainspace, so that if subsequent program execution makes use of these objects they will be copied to an activity 0 bucket at that time.

In summary, the adaptive memory management system "learns" about which objects are currently active by detecting normal program references to objects located in either oldspace or trainspace. The adaptive memory management system "forgets" about objects which were active in the past but not active now when the scavenger causes the copy from oldspace rather than normal program execution.

When a generation is collected, all buckets for that generation are marked as oldspace, regardless of activity level. Coalescing of active and inactive newspace buckets when a generation is collected allows the system to change over time to track changes in usage. The net effect of dividing newspace into active and inactive regions is to optimize memory allocation for a particular usage pattern. If that pattern changes over time, the garbage collection process will cause the allocation of objects between active and inactive newspace to change also. Thus, the system remains efficient even when usage patterns change.

Objects which are newly created during scavenging are placed into a generation 0 newspace bucket (not shown). This bucket has an active attribute. This bucket also has a volatility of 0, so that pointers therein are allowed to point anywhere. Pointers to objects in this bucket from older generations are routed through indirection cells contained in active attribute newspace buckets (1,0), (2,0), and (3,0). (not shown) A complete description of this process is found in the above noted copending application, titled TEMPORAL GARBAGE COLLECTOR WITH INDIRECTION CELLS, by Courts, which is incorporated by reference.

The garbage collection process works in a similar manner when higher generations are collected. For example, when it becomes necessary or desirable to collect generation 1, generation 0 is first collected. Then all buckets in generation 1 are marked as oldspace. All buckets in generation 0 and the (2,0), (3,0), (2,1) and (3,1) buckets are marked as scavenge space, since these buckets can all contain pointers into generation 1 buckets. Buckets (2,2), (3,3) (both having activity 0) and bucket (3,2) are marked as newspace, and the other generation 2 and 3 buckets with non-zero activity are marked as trainspace. Collection then proceeds in the manner described above. Generations 2 and 3 are collected in an analogous manner after first collecting all lower numbered generations. Since garbage is most frequently found in generation 0, it is collected the most often. Usually, collection of generation 0 is a more or less continuous process, with higher numbered generations being collected much less frequently.

It is possible to pre-learn an optimal configuration for a system which will have a known usage. For example, the Explorer symbolic processor manufactured by Texas Instruments uses load bands to initialize the system after it is booted up. A load band is disk storage which contains all of the system routines which the user expects to use. If a radically different system configuration is desired, the user can reboot the system using a different load band. A load band can be created by a standard routine which captures the current state of the system. By running the system for a period of time, to optimize it for the current use, and then saving the state of the system into a load band, the system can be initially booted into the saved optimized configuration at any future date. Different load bands can be created for different major desired configurations, and the appropriate one used to boot the system each time usage will change. This gives the system a head start toward optimization when it is booted, and the initial learning process is bypassed. Of course, the system will continue to adapt to each particular user. It is possible to create a set of optimized load bands at the factory, and ship them to all system users. This way, users need not undergo the initial learning process for their system.

Once the system has been optimized, the amount of paging to disk caused by page faults is greatly reduced. The objects actually used by a user may all actually fit into physical memory, which means that no paging would be required at all. This drastically improves overall system performance. Each user will have a machine which is optimized to his use, so users having different usage patterns will all obtain good system performance.

In order to implement the system described above, it is necessary to be able to determine several attributes of memory addresses on a regular basis. Each time a pointer is handled, it is necessary to determine generation, volatility and other information for two virtual addresses: the address where the pointer is located, and the address pointed to by the pointer. It is preferred that this information, referred to as region attributes, be located in a table much like the page table used for virtual paging information. When this information is needed, it is easily extracted from the table. The table need not be large, because only one entry is needed for each region.

As a preferred matter of implementation, large objects are never copied to inactive newspace by the scavenger. Large is a relative term, and preferably refers to objects larger than one virtual page. Such objects will not contribute to fragmentation of virtual pages as do smaller objects, and are already handled efficiently by the paging mechanism. Thus, identifying them as inactive when they are scavenged, and later perhaps copying them to an active region, is a waste of effort. The scavenger still copies smaller objects to inactive newspace as described above; only large objects are an exception.

TECHNICAL ADVANTAGES

The garbage collection system described herein adapts memory usage in the system to actual usage. This allows the placement of objects within the virtual address space to be optimized for the usage pattern experienced on that system. If usage patterns change over time, the system changes as a normal part of garbage collection to remain optimized. Well optimzed systems tend to operate at a greatly improved performance rate, since virtual page faults and disk paging is minimized. An optimized system can be saved, so that the next time a similar usage pattern is desired an already optimized memory configuration can be loaded at system boot up time. This eliminates the initial training period for commonly used applications.

The present invention has been illustrated by the system described above, and it will become apparent to those skilled in the art that various modifications and alterations may be made thereto. Such variations fall within the spirit of the present invention, the scope of which is defined by the claims.

What is claimed is:

1. A memory management system for a digital computer, comprising:
   (a) a central processor;
   (b) a virtual memory divided into plural contiguous regions, each said region defining requirements for entry of objects having pointers therein by the combination of a generation, a volatility level and an activity level, the generation indicating the age of the object in said memory, the volatility level indicating the youngest generation to which objects in that region may contain said pointers and the activity level indicating whether objects in a said region have been active by having been accessed by program execution, the region of predetermined oldest generation being defined as oldspace, the region containing said object having pointers for pointing into said oldspace being defined as scavenge space, the remaining region with high activity being defined as newspace and the remaining region with other than high activity being defined as trainspace;
   (c) a transport mechanism for copying objects to said regions having an activity level which indicates objects therein are currently active when objects in one of oldspace or trainspace are referenced by an executing program and for copying objects to said regions having an activity level which indicates objects therein are currently not active when objects in one of oldspace or trainspace are copied by a scavenger;
   (d) a read barrier coupled to said central processor and to said virtual memory for moving all data from said virtual memory to said central processor therethrough, said read barrier preventing objects having pointers pointing into regions classified as oldspace from being placed into said central processor; and
   (e) a write barrier coupled to said central processor and to said virtual memory for moving all data from said central processor to said virtual memory therethrough, said write barrier preventing objects having pointers from being placed into addresses in a source region which points to a destination region having a generation which is not allowed by the volatility associated with the source region.

2. The memory management system of claim 1, further including dividing said virtual memory into four generations, and dividing each generation into a number of regions such that each region for each generation has a different earliest generation to which it may contain said pointers.

3. The memory system of claim 1, further including creating an indirection cell by said write barrier in a region having the same generation as the source region and having an associated volatility which can contain a pointer into the destination region when an attempt to write a pointer is made which is not allowed by the volatility of the source region to place the value of the pointer from the source region into the indirection cell, and to place a pointer to the indirection cell into the address in the source region where the original pointer was to have been located.

4. The memory management system of claim 1, further including, at the initiation of a garbage collection process for a given generation, designating all regions of that generation as oldspace, all regions of older generations which are allowed by their associated volatility to contain pointers into the given generation as scavenge space and all other regions as newspace.

5. A memory management system for a digital computer, comprising:
   (a) a central processor;
   (b) a virtual memory coupled to said central processor, said virtual memory being divided into plural contiguous spaces, each of said spaces having an activity attribute which indicates whether memory objects in said spaces are active or inactive, and being designated in response to said activity attribute as belonging uniquely to one of newspace, oldspace, scavenge space, or trainspace; and
   (c) a transport mechanism coupled to and responsive to each of said central processor and said virtual memory to cause referenced memory objects to be copied from at least one of said oldspace or trainspace to a said scavenge space having inactive memory objects when such referenced memory objects are referenced by a garbage collection scavenger, said transport mechanism causing referenced memory objects to be copied to a space having active memory objects when such referenced objects are referenced by normal program execution, said transport mechanism, in response to reference of said memory objects by normal program execution, copying memory objects located in oldspace to a scavenge space having active memory objects and copying memory objects located in trainspace to a newspace region having active memory objects.

6. A memory management system for a digital computer, comprising:

(a) a central processor;

(b) a virtual memory coupled to said central processor, said virtual memory being divided into plural contiguous spaces, each said space having an activity attribute which indicates whether memory objects in the region are active or inactive, and being designated in response to said activity attribute as belonging uniquely to one of newspace, oldspace, scavenge space, or trainspace; and (c) a transport mechanism coupled to and responsive to each of said central processor and said virtual memory to cause referenced memory objects to be copied from at least one of oldspace or trainspace to a scavenge space having inactive memory objects when such referenced memory objects are referenced by a garbage collection scavenger, said transport mechanism causing referenced memory objects to be copied to a space having active memory objects when such referenced memory objects are referenced by normal program execution, (d) said spaces of said virtual memory having activity attributes which indicate four levels of activity, with the most active level considered as active, and the remaining three levels indicating decreasing levels of activity and being considered as inactive, memory objects copied after being referenced by said garbage collection scavenger are copied to a scavenge space having an activity level which is less than or equal to the activity level of the space from which the memory objects were copied.

7. A method of managing a memory system for a digital computer, comprising the steps of:

(a) providing a central processor;

(b) providing a virtual memory;

(c) separating said virtual memory into plural contiguous regions, each said region defining requirements for entry of objects having pointers therein by the combination of a generation, a volatility level and an activity level, the generation indicating the age of the object in said memory, the volatility level indicating the youngest generation to which objects in that region may contain said pointers and the activity level indicating whether objects in a said region have been active by having been accessed by program execution, the region of predetermined oldest generation being defined as oldspace, the region containing said object having pointers for pointing into said oldspace being defined as scavenge space, the remaining region with high activity being defined as newspace and the remaining region with other than high activity being defined as trainspace;

(d) providing objects to said regions having an activity level which indicates objects therein are currently active when objects in one of oldspace or trainspace are referenced by an executing program and providing objects to said regions having an activity level which indicates objects therein are currently not active when objects in one of oldspace or trainspace are copied by a scavenger;

(e) transferring all data from said virtual memory to said central processor while preventing objects having pointers pointing into regions classified as oldspace from being placed into said central processor; and (f) transferring all data from said central processor to said virtual memory while preventing objects having pointers from being placed into addresses in a source region which points to a destination region having a generation which is not allowed by the volatility associated with the source region.

8. The method of claim 7, further including separating said virtual memory into four generations, and separating each generation into a number of regions such that each region for each generation has a different earliest generation to which it may contain said pointers.

9. The method of claim 7, further including creating an indirection cell in a region having the same generation as the source region and having an associated volatility which can contain a pointer into the destination region when an attempt to write a pointer is made which is not allowed by the volatility of the source region to place the value of the pointer from the source region into the indirection cell, and to place a pointer to the indirection cell into the address in the source region where the original pointer was to have been located.

10. The method of claim 7, further including, initiating a garbage collection process for a given generation and designating all regions of that generation as oldspace, all regions of older generations which are allowed by their associated volatility to contain pointers into the given generation as scavenge space and all other regions as newspace in response to said initiating a garbage collection process.

11. A method for managing a memory system for a digital computer, comprising the steps of:

(a) providing a central processor;

(b) providing a virtual memory coupled to said central processor;

(c) separating said virtual memory into plural contiguous spaces, each said space having an activity attribute which indicates whether memory objects in the space are active or inactive, and being designated in response to said activity attribute as belonging uniquely to one of newspace, oldspace, scavenge space, or trainspace;

(d) copying referenced memory objects from at least one of oldspace or trainspace to a scavenge space having inactive objects when such referenced memory objects are referenced by a garbage collection scavenger; and (e) copying referenced memory objects at a space having active memory objects when such referenced memory objects are referenced by normal program execution;

(f) providing, in response to reference of said memory objects by normal program execution, memory objects located in oldspace to a scavenge space having active memory objects, and providing memory objects located in trainspace to a newspace having active objects.

12. A method for managing a memory system for a digital computer, comprising the steps of:

(a) providing a central processor;

(b) providing a virtual memory coupled to said central processor;

(c) separating said virtual memory into plural contiguous spaces, each said space having an activity attribute which indicates whether memory objects in the region are active or inactive, the spaces of said virtual memory having activity attributes which indicate four levels of activity, with the most active level considered as active, and the remaining three levels indicating decreasing levels of activity and being considered as inactive, said space being designated in response to said activity attribute as belonging uniquely to one of newspace, oldspace, scavenge space, or trainspace;

(d) copying referenced memory objects from at least one of oldspace or trainspace to a scavenge space having inactive objects when such referenced memory objects are referenced by a garbage collection scavenger; and (e) copying referenced memory objects at a region having active memory objects when such referenced memory objects are referenced by normal program execution;

(f) memory objects copied by the garbage collection scavenger being copied to a scavenge space having an activity level which is less than or equal to the activity level of the space from which such memory objects were copied.

* * * * *